United States Patent
Tsegelsky

(10) Patent No.: US 8,337,672 B2
(45) Date of Patent: Dec. 25, 2012

(54) METHOD AND DEVICE FOR PRODUCING VACUUM IN A PETROLEUM DISTILLATION COLUMN

(76) Inventor: Valery Grigorievich Tsegelsky, Moscow (RU)

( * ) Notice: Subject to any disclaimer, the term of this patent is extended or adjusted under 35 U.S.C. 154(b) by 385 days.

(21) Appl. No.: 12/809,319

(22) PCT Filed: Nov. 6, 2008

(86) PCT No.: PCT/RU2008/000692
§ 371 (c)(1),
(2), (4) Date: Jul. 26, 2010

(87) PCT Pub. No.: WO2009/082263
PCT Pub. Date: Jul. 2, 2009

(65) Prior Publication Data
US 2010/0288623 A1    Nov. 18, 2010

(30) Foreign Application Priority Data
Dec. 20, 2007 (RU) .................. 2007147055

(51) Int. Cl.
*B01D 3/10* (2006.01)
*C10G 7/06* (2006.01)

(52) U.S. Cl. .......... 203/11; 196/100; 196/114; 196/140; 202/172; 202/176; 202/182; 202/202; 202/205; 203/22; 203/25; 203/79; 203/92; 203/96; 203/DIG. 8; 203/DIG. 14; 203/DIG. 16; 208/353; 208/354; 208/356; 208/357; 208/363; 208/366; 417/76

(58) Field of Classification Search .................. 196/100, 196/114, 140; 202/153, 172, 176, 182, 202, 202/204, 205; 203/11, 14, 22, 25, 79, 92, 203/96, DIG. 4, DIG. 8, DIG. 14, DIG. 16; 208/187, 347, 353, 354, 356, 357, 363, 366; 417/53, 76
See application file for complete search history.

(56) References Cited

U.S. PATENT DOCUMENTS
5,762,763 A * 6/1998 Tsargorodski .................. 203/11
(Continued)

FOREIGN PATENT DOCUMENTS
RU    2086603 C1    8/1997
(Continued)

*Primary Examiner* — Virginia Manoharan
(74) *Attorney, Agent, or Firm* — Osha•Liang LLP

(57) ABSTRACT

The invention relates to the oil processing industry and can be used for producing vacuum in a vacuum petroleum distillation column. The inventive method involves pumping out a vapor-gas medium from the column by of a gas-gas ejector in such a way that a vapor-gas mixture is formed at the entry thereof and supplying said mixture to a condenser for producing a gas mixture and a vapor phase condensate. The gas mixture is supplied from the condenser to a liquid-gas jet apparatus and the condensate is delivered to an additional separator. A hydrocarbon-containing condensate is removed from the additional separator for the intended use thereof and a water-containing condensate is fed to a steam generator for producing steam by supplying heat of a hot distillate evacuated from the vacuum column. The thus obtained steam is used in the gas-gas ejector as a high-pressure gas. The device includes a line for supplying a distillate of petroleum distillation, a line for removing a distillate of petroleum refining, the steam generator and the additional separator. The invention makes it possible to reduce energy consumption, increase vacuum depth and to exclude the use of a water vapor delivered from an external source.

14 Claims, 1 Drawing Sheet

U.S. PATENT DOCUMENTS

| | | | |
|---|---|---|---|
| 5,980,698 A * | 11/1999 | Abrosimov et al. | 203/94 |
| 6,086,721 A * | 7/2000 | Tsegelsky | 196/114 |
| 6,348,134 B1 * | 2/2002 | Popov | 196/114 |
| 6,398,918 B1 * | 6/2002 | Popov | 203/2 |
| 6,579,069 B2 * | 6/2003 | Tsegelsky | 417/53 |
| 6,767,191 B2 * | 7/2004 | Tsegelsky | 417/53 |
| 7,267,747 B2 | 9/2007 | Musial | |
| 7,429,312 B2 * | 9/2008 | Skakunov et al. | 203/2 |
| 8,034,159 B2 * | 10/2011 | Tsegelsky | 95/42 |
| 2006/0254280 A1 * | 11/2006 | Briesch et al. | 60/772 |
| 2007/0278088 A1 | 12/2007 | Musial | |
| 2008/0253901 A1 * | 10/2008 | Holtzapple et al. | 417/54 |

FOREIGN PATENT DOCUMENTS

| | | |
|---|---|---|
| RU | 2102103 C1 | 1/1998 |
| WO | 2007102751 A1 | 9/2007 |

* cited by examiner

METHOD AND DEVICE FOR PRODUCING VACUUM IN A PETROLEUM DISTILLATION COLUMN

The invention relates to methods and plants for producing vacuum in a vacuum oilstock distillation column by supplying steam to the vacuum column and/or to the oilstock, an can be used in the oil processing industry to produce vacuum in a vacuum rectification column for distilling black oil.

Known is a method for producing vacuum in a vacuum oilstock distillation column (black oil) by pumping out a vapour-gas medium from the column by means of a vapour ejector consisting of a series of gas-gas ejectors fed with steam used as a high pressure gas supplied from an external source (see, published application U.S. 2004/0188237 A1, IPC B01D 3/14, Sep. 30, 2004).

Supplying vapour-gas mixture from a gas-gas ejector to a condenser followed by cooling thereof and condensing vapour phase of the vapour-gas mixture is also known from said patent.

The above indicated patent also teaches a plant for producing vacuum in a vacuum oilstock distillation column comprising a gaseous vapour discharge pipeline, a gas-gas ejector and a condenser; in the plant the gas-gas ejector at a low-pressure gas inlet end is connected to the gaseous vapour discharge pipeline, at a high-pressure gas inlet it is connected to the external vapour source, at a gaseous vapour outlet it is connected to a condenser inlet having a gaseous mixture and a condensate outlet.

A drawback of the known method and the plant consists in using external steam source and discharging water condensate in a mixture with petroleum fraction from the plant that leads to environmental pollution and a loss of a distillation product.

Another drawback is a considerable energy consumption caused by using great amounts of steam and water required to perform a multistage compression of the vapour-gas medium using gas-gas ejectors and a condensation of the steam between the stages.

The closest prior art in part of a method as a subject matter of the invention in terms of technical entity and attained result is represented by a method for producing vacuum in a vacuum petroleum distillation column that comprises pumping out a vapour-gas medium from the vacuum column with a gas-gas ejector fed with a high-pressure gas to form at an outlet of the ejector a vapour-gas mixture having a pressure greater than a pressure of the vapour-gas medium, feeding the vapour-gas mixture and pumping a liquid to a liquid-gas jet device, mixing the vapour-gas mixture and the liquid in the liquid-gas jet device to form a gas-liquid mixture at an outlet thereof, supplying the gas-liquid mixture from the liquid-gas jet device to a separator to separate the mixture into a compressed gas and a liquid, evacuating the compressed gas from the separator for the intended use thereof and supplying the liquid to the inlet end of the pump (see, patent RU 2310678, IPC B01D 3/10, Nov. 20, 2007).

The closest prior art in part of a plant as a subject matter of the invention in terms of technical entity and attained result is represented by a plant for producing vacuum in a vacuum petroleum distillation column that comprises a pipeline for discharging vapour-gas medium from the vacuum column, a gas-gas ejector, a condenser, a liquid-gas jet device, a separator, a pump and an additional pump; in the plant the gas-gas ejector at a low-pressure gas inlet is connected to the pipeline for discharging vapour-gas medium from the vacuum column, the liquid-gas jet device at a liquid inlet is connected to the pump outlet end, at a gas-liquid outlet it is connected to the separator having a compressed gas outlet and a liquid outlet connected to the pump inlet (see, patent RU 2310678, IPC B01D 3/10, Nov. 20, 2007).

The main drawback of the above method for producing vacuum in a vacuum oilstock (inter alia black oil) distillation column and the plant for implementing thereof is a high power a pump of a vacuum producing device consumes especially in a case the oilstock distillation is performed with feeding steam to the vacuum column operating at a pressure lower than 6 kPa.

A problem the present invention is intended to solve is a production of a high-pressure gas from a water-containing medium formed while the plant is operating using heat of oil distillates or oilstock as well as reducing environmental pollution due to the bleeding the water-containing medium comprising hydrocarbons by organizing its circulation within a closed contour in the plant.

A technical result consists in that the energy consumed to produce vacuum is reduced, vacuum depth is increased, environmental pollution is reduced, and no steam supplied from an external source to the plant is now required.

Said problem is solved and the technical result is attained in part of a method as a subject matter of the invention by virtue of a method for producing vacuum in a vacuum oilstock distillation column, said method comprises pumping out a vapour-gas medium from the vacuum column using a gas-gas ejector fed with a high-pressure gas to form at an outlet of the gas-gas ejector a vapour-gas mixture having a pressure greater than a pressure of the vapour-gas medium at an inlet thereof, supplying the vapour-gas mixture to a condenser followed by cooling thereof and forming a gas mixture and a vapour phase condensate, supplying the gas mixture and pumping a liquid to a liquid-gas jet device with a pump, mixing the gas mixture and the liquid in the liquid-gas jet device to form a gas-liquid mixture at an outlet thereof, supplying the gas-liquid mixture from the liquid-gas jet device to a separator to separate the mixture into a compressed gas and a liquid, discharging the compressed gas for the intended use thereof and supplying the liquid to the inlet of the pump, wherein the vapour phase condensate formed in the condenser is supplied to an additional separator wherein the vapour phase condensate is separated into a water-containing condensate and a hydrocarbon-containing condensate, the hydrocarbon-containing condensate is evacuated from the additional separator for the intended use thereof, and the water-containing condensate is pumped using an additional pump to a steam generator, wherein heat of a hot distillate evacuated from the vacuum oilstock distillation column or from a petroleum distillation column is supplied to the water-containing condensate to produce steam, and the steam produced in the steam generator is fed to the gas-gas ejector as the high-pressure gas.

The steam having a pressure in the range of 0.2-0.6 MPa is preferably produced in the steam generator.

A portion of the water-containing condensate which is not evaporated in the steam generator is preferably evacuated to the additional separator, at the same time this portion of the water-containing condensate is preferably cooled in a heat exchanger prior to evacuation to the additional separator.

It is preferred to additionally supply the steam from the steam generator into the vacuum oilstock distillation column and/or to the oilstock prior to supply thereof to the vacuum column. It is preferred to additionally heat the steam from the steam generator in a furnace using heat of hot gases prior to supply thereof to the gas-gas ejector and/or the vacuum column. The steam from the steam generator can be fed to the vacuum oilstock distillation column via an additional gas-gas ejector, thus the latter can additionally evacuate the vapour-gas medium from said vacuum column.

Said problem is solved and the technical result is attained in part of a plant as a subject matter of the invention by virtue of a plant for producing vacuum in a vacuum oilstock distillation column, comprising a pipeline for evacuating a vapour-gas medium from the vacuum oilstock distillation column, a gas-gas ejector, a condenser, a liquid-gas jet device, a separator, a pump and an additional pump, wherein the gas-gas ejector is connected at a low-pressure inlet thereof to the pipeline for evacuating a vapour-gas medium from the vacuum column and at a vapour-gas mixture outlet thereof is connected to the condenser inlet, the latter has a condensate outlet and a gas mixture outlet connected to the liquid-gas jet device via a gas inlet, wherein the liquid-gas jet device is connected to the pump outlet via a liquid inlet and to the separator via a gas-liquid outlet, the separator has a compressed gas outlet and liquid outlet connected to the pump inlet, the plant is provided with a pipeline for supplying petroleum or oilstock distillate, a pipeline for evacuating petroleum or oilstock distillate from the plant, a steam generator and an additional separator connected at an inlet thereof to a condensate outlet of the condenser; the hydrocarbon-containing condensate outlet of the additional separator is connected to a pipeline for evacuation thereof from the plant, and the water-containing condensate outlet of the additional separator is connected to the additional pump inlet, the additional pump outlet is connected to the water-containing condensate inlet of the steam generator, the steam outlet of the steam generator is connected to the high-pressure gas inlet of the gas-gas ejector, wherein the steam generator at a heating agent inlet thereof is connected to the pipeline for supplying petroleum or oilstock distillate and at a heating agent outlet thereof is connected to the pipeline for evacuating petroleum or oilstock distillate from the plant.

The steam generator can have a non-evaporated condensate outlet connected to the additional separator, at the same time the non-evaporated condensate outlet of the steam generator can be connected to the additional separator inlet via a heat exchanger.

The steam outlet of the steam generator can be additionally connected to the vacuum oilstock distillation column and/or to the pipeline for supplying oilstock to this vacuum column.

The steam outlet of the steam generator can be connected to the high-pressure gas inlet of the gas-gas ejector and/or to the vacuum oilstock distillation column via heat exchange pipes for heating steam in a furnace.

An additional gas-gas ejector connected at a low-pressure gas inlet thereof to the pipeline for evacuating vapour-gas medium from said vacuum column and connected at the steam inlet to the steam outlet of the steam generator can be mounted on a pipeline supplying the steam to the vacuum column.

The condenser can consist of a vapour condensing device and a phase separator, in this case an inlet of the vapour condensing device is connected to the vapour-gas mixture outlet of the gas-gas ejector, a biphasic mixture outlet of the vapour condensing device is connected to an inlet of the phase separator having a condensate outlet and a gas mixture outlet.

Disclosed method and plant for accomplishing thereof allow vacuum to be produced in a vacuum oilstock distillation column by a two-stage compression of a vapour-gas medium with an intermediate condensation of the vapour phase between the stages. At the same time at each one of the compression stages a main part of working fluid of the high-pressure flow (an ejecting stream) fed both to the gas-gas ejector (steam from the water-containing condensate) and to the liquid-gas jet device (a working fluid) circulates within a closed contour. Relatively small substitution of the circulating working fluid occurs due to the formation of a condensate of the vapour phase of the vapour-gas medium pumped out from the vacuum oilstock distillation column. A small substitution of the circulating working fluid with the substance from an external source is also possible, especially at the second stage of compression.

At the second stage of compression it is preferred to use a hydrocarbon-containing liquid as a working fluid pumped to the liquid-gas jet device. Diesel and gas oil fractions of petroleum or oilstock processing can be used as said liquid as well as liquids close to said ones in their physical/chemical properties. These liquids are also used to partially substitute the liquid circulating at the second stage of compression. All these measures decrease environmental pollution and enhance ecological reliability of the plant for producing vacuum in the vacuum oilstock distillation column.

At the first stage of the claimed plant a gas-gas ejector is used, it is fed with a high-pressure gas (an ejecting gas) being steam produced in the steam generator from the water-containing condensate obtained in the additional separator during the separation of the vapour phase condensate to the water-containing and the hydrocarbon-containing condensates.

The water-containing condensate is a water condensate in a case of complete phase separation occurred in the additional separator, or it is a mixture of water condensate and a small amount of a hydrocarbon condensate in a case of incomplete phase separation. To produce vacuum in a rectification column for black oil distillation operated with feeding steam in this column it is more effective to use steam from the water condensate as the high-pressure gas fed to the gas-gas ejector while separating the steam from the hydrocarbon condensate evacuated from the plant in the additional separator as completely as possible.

It is because of a vapour-gas medium pumped out of the column contains a significant amount of steam that requires a lot of energy for its compression. In order to effectively compress such a vapour-gas medium it is desirable to feed a steam from the water condensate as a high-pressure gas to the gas-gas ejector, since it possesses higher capacity in comparison with a vapour of the hydrocarbon condensate, or, as a last resort, a mixture of these two components having lower percentage of the latter. Further water vapour produced in the steam generator from the water-containing condensate will be referred to as steam.

In this case the water-containing condensate circulates at the first stage of compression of the vacuum producing plant within the following contour:

the water-containing condensate is pumped using the additional pump to the steam generator wherein it is converted into steam by supplying heat from a hot distillate of the petroleum distillation column or vacuum oilstock distillation column;

the steam from the steam generator is supplied to the gas-gas ejector as a high-pressure gas and compresses a vapour-gas medium from a column pressure of 0.6 . . . 6.0 kPa up to the vapour-gas medium of 3.5 . . . 9.0 kPa at the condenser inlet;

the vapour-gas medium is cooled in the condenser using a cooling agent having initial temperature of 5° C. to 35° C., and a separation to a gas mixture and a vapour phase condensate separated from the vapour-gas medium in the course of its cooling occurs;

the vapour phase condensate being a mixture of water condensate and a hydrocarbon condensate flows to the additional separator;

the vapour phase condensate separates into the water condensate and a hydrocarbon condensate in the additional separator;

the water condensate from the additional separator is supplied to the additional pump inlet and subsequently to the steam generator, and the hydrocarbon condensate and an excessive water condensate formed due to the condensation of steam fed to the condenser from the vacuum oilstock distillation column are evacuated from the plant.

Circulation of the water condensate and producing steam from it by supplying heat of the hot distillate evacuated from the petroleum distillation column or the vacuum oilstock distillation column excludes consumption of steam supplied from an external source by the vacuum producing plant. All the above, as well as accomplishing two-stage compression of the vapour-gas medium with an intermediate condensation of the vapour phase between the stages leads to a decreased energy consumption for producing vacuum and enhances vacuum depth.

It is also expedient to supply petroleum or oilstock distillate to the steam generator as a heating agent which heat is commonly transferred (dissipated in) to environment. Petroleum processing distillates having a temperature of from 130° C. to 170° C. possess this heat, so it allows steam having a pressure of from 0.2 MPa to 0.6 MPa to be produced.

In a case not all water-containing condensate is vaporized in the steam generator it is expedient to evacuate non-evaporated portion thereof to the additional separator. This could take place either in a case of an incomplete phase separation in the additional separator and when high boiling point hydrocarbons are present in the water condensate, or in a case steam is formed in the steam generator due to a flash boiling in the volume of the condensate which is overheated in comparison with a temperature of saturated water vapours being in equilibrium with its vapours at a pressure in the volume.

In a case a considerable amount of non-evaporated water condensate is evacuated from the steam generator to the additional separator it is expedient to supply its heat to a cold water condensate fed to the steam generator using a heat exchanger that allows heat saving.

A portion of steam (water vapour) from the steam generator can be fed to the gas-gas ejector as a high-pressure gas, and the other portion of steam (water vapour) can be fed to the vacuum oilstock distillation column and/or to the oilstock heated in the furnace prior to supply it to the vacuum column.

This reduces steam consumption from the external source during vacuum oilstock distillation, so energy consumption of distillation and environmental pollution are decreased.

Steam the steam generator supplies can be additionally heated in the furnace using the heat of hot gases. This enhances operation properties of the steam.

A portion of steam from the steam generator can be supplied to the vacuum oilstock distillation column via additional gas-gas ejector connected at the low-pressure inlet to the pipeline for discharging vapour-gas medium from the vacuum column. This allows amount of steam fed from the steam generator to the vacuum column and vapour-gas medium flow to the gas-gas ejector to be reduced. The latter circumstance leads to reducing steam flow from the steam generator to the gas-gas ejector. All the above decreases condenser heat load, reduces its size and energy consumption.

The condenser can comprise phase separator wherein a biphasic mixture supplied thereto from vapour condenser (condensation zone) separates into a vapour phase condensate and a gas mixture, wherein the gas mixture outlet of the phase separator is connected to its inlet to the liquid-gas jet device, and the vapour phase condensate outlet of the phase separator is connected to its inlet to the additional separator.

Use of the phase separator allows more complete separation of a gas mixture which has not been condensed in the condenser from the vapour phase condensate formed during its cooling.

FIG. 1 represents a scheme of a plant for producing vacuum in vacuum oilstock distillation column 1 with pipeline 2 for supplying oilstock connected thereto, pipeline 3 for supplying steam, pipeline 4 for evacuating distillate from vacuum column 1, pipeline 5 for evacuating distillation residue, pipeline 6 for discharging vapour-gas medium. The plant for producing vacuum comprises gas-gas ejector 7, condenser 8, liquid-gas jet device 9, separator 10, pump 11 and additional pump 12.

Gas-gas ejector 7 is connected to pipeline 6 for discharging vapour-gas medium from vacuum column 1 at low-pressure gas inlet 13, at vapour-gas outlet 14 it is connected to inlet 15 of the condenser 8 having vapour phase condensate outlet 16 and gas mixture outlet 17 connected to its inlet 18 to gas-liquid jet device 9.

Gas-liquid jet device 9 is connected to the outlet of pump 11 at liquid inlet 19, at gas-liquid mixture outlet 20 it is connected to separator 10 having compressed gas outlet 21 and liquid outlet 22 connected to the inlet of pump 11.

The plant is provided with steam generator 23, additional separator 24, pipeline 25 for supplying petroleum or oilstock distillate, pipeline 26 for evacuating petroleum or oilstock distillate from the plant.

Additional separator 24 is connected to vapour phase condensate outlet 16 of condenser 8 at inlet 27, at hydrocarbon-containing condensate outlet 28 it is connected to pipeline 29 for its evacuation from the plant, at water-containing condensate outlet 30 it is connected to the inlet of additional pump 12, the outlet of additional pump 12 is connected to water-containing condensate inlet 31 of steam generator 23, steam outlet 32 of steam generator 23 is connected to high-pressure gas inlet 33 of gas-gas ejector 7.

Steam generator 23 at heating agent inlet 34 is connected to pipeline 25 for supplying petroleum or oilstock distillate, at heating agent outlet 34 it is connected to pipeline 26 for evacuating petroleum or oilstock distillate from the plant.

Steam generator 23 can have non-evaporated condensate outlet 36 connected to additional separator 24.

Heat exchanger 37 can be installed between non-evaporated condensate outlet 36 of the steam generator and additional separator 24 inlet.

Steam outlet 32 of steam generator 23 can additionally be connected to pipeline 3 for supplying steam to vacuum column 1 and/or pipeline 2 for supplying oilstock thereto.

Additional gas-gas ejector 38 connected at low-pressure gas inlet 39 to pipeline 6 for discharging vapour-gas medium from vacuum column 1 can be installed at pipeline 3 for supplying steam into vacuum column 1.

Condenser 8 can comprise steam condensation device 40 connected to phase separator 41 separating a biphasic mixture supplied thereto into a condensate and a gas mixture.

Pipeline 25 for supplying distillate to steam generator 23 can be connected to pipeline 4 for evacuating distillate from vacuum column 1 or to pipeline 42 for evacuating distillate from atmospheric of high pressure petroleum distillation column 43. Furnace 44 for heating oilstock can be installed at pipeline 2 for supplying oilstock to the vacuum column. Steam outlet 32 of steam generator 23 can be connected to inlet 33 of gas-gas ejector 7 and/or to pipeline 3 for supplying steam to vacuum column 1 via steam heating pipes (that are not depicted on FIG. 1) of furnace 44. Cooling heat exchanger 45 can be installed between liquid outlet 22 of separator 10 and liquid inlet 19 of liquid-gas jet device 9.

An excess of water-containing condensate can be evacuated from the plant via pipeline 46, in a case there is not enough water-containing condensate water or water condensate can be supplied via pipeline 47.

Steam generator 23 can have different constructive design and can comprise a set of elements e.g. economizer 48, evaporator 49, steam heater 50, non-vaporized condensate separator 51 and other interconnected elements. But any construction of steam generator 23 comprising different number of elements connected to each other is intended for attaining the same purpose namely to produce steam from the water-containing condensate by supplying a heat of a hot distillate fed via pipeline 25 and passing through the steam generator.

Operation of a plant for accomplishing the proposed method will now be illustrated by an example of distilling black oil used as an oilstock.

Oilstock (black oil) is heated in furnace 44 and fed as a vapour-liquid mixture via pipeline 2 to vacuum column 1 having a top pressure 0.6 . . . 6.0 kPa for distillation. Steam is supplied to vacuum oilstock distillation column 1 via pipeline 3. Steam can be supplied to vacuum oilstock distillation column 1 together with oilstock via pipeline 2. A distillate (e.g. vacuum gas oil) is evacuated from vacuum column 1 as a side-cut via pipeline 4, and distillation residue being asphaltum oil is evacuated from the bottom of the column via pipeline 5. A vapour-gas medium which is a mixture of gas, light hydrocarbon vapours and water vapour is evacuated from the top of vacuum column 1 via pipeline 6.

Vapour-gas medium from vacuum column 1 is supplied to gas-gas ejector 7 wherein steam (water vapour) from steam generator 23 is supplied via inlet 33 as a high-pressure gas. Steam pumps out and compresses the vapour-gas medium which is fed to inlet 13 of gas-gas ejector 7 as a low-pressure gas. Compression occurs due to a transfer of kinetic energy from the high-pressure gas (water vapour) to the low-pressure gas in the course of their mixing in gas-gas ejector 7. As a result a pressure of a vapour-gas mixture at the outlet of ejector 7 becomes greater than a pressure of a vapour-gas mixture at its inlet.

The vapour-gas mixture from ejector 7 is supplied to inlet 15 of condenser 8 wherein it is cooled due to a heat transfer through its wall to a cooling agent e.g. water having initial temperature of from 5° C. to 35° C. In the course of cooling the vapour-gas mixture a vapour phase condensate forms, which is a mixture of water vapour condensate and a condensate of hydrocarbon vapours present in the vapour-gas mixture. A separation of vapour phase condensate from a gas mixture (a non-condensed portion of the vapour-gas mixture) is carried out in condenser 8. Condenser 8 can consist of phase separator 41 and vapour condensation device 40 connected thereto for better separating the vapour phase condensate from the gas mixture.

The vapour phase condensate is supplied to additional separator 24 from condenser 8 via outlet 16.

The vapour phase condensate is separated in additional separator 24 to a water-containing condensate (water condensate in a case of 100% phase separation) and hydrocarbon-containing condensate (hydrocarbon condensate in a case of 100% phase separation). The hydrocarbon-containing condensate is evacuated from additional separator 24 via outlet 28 to pipeline 29 for its discharging from the plant, and water-containing condensate is pumped out from outlet 30 using additional pump 12 to feed it to inlet 31 of steam generator 23. An excess of the water-containing condensate is evacuated from the plant via pipeline 46. Heat of a heating steam is supplied to the water-containing condensate in steam generator 23 to produce steam (water vapour) which is supplied to gas-gas ejector 7 as a high-pressure (ejecting) gas. A heating agent is fed to inlet 34 of steam generator 23 via pipeline 25 for supplying petroleum or oilstock distillate. At the same time pipeline 25 can be connected to pipeline 42 for evacuating distillate from petroleum distillation column 43 or to pipeline 4 for evacuating distillate from vacuum oilstock distillation column 1.

Spent heating agent from steam generator 23 is discharged from outlet 35 into pipeline 26 for evacuating petroleum or oilstock distillate from the plant. In a case not all the water-containing condensate is vaporized in steam generator 23 non-vaporized portion thereof is separated from steam e.g. in separator 51 and evacuated from steam generator 23 via outlet 36 into additional separator 24. In a case of a great flow of the non-vaporized condensate heat exchanger 37 for cooling the non-vaporized condensate can be installed at the pipeline between the condensate outlet 36 of steam generator 23 and the condensate inlet of additional separator 24. In this case it is expedient to pump a water-containing condensate supplied to steam generator 23 through heat exchanger 37 as a cooling liquid. This allows a heat of non-vaporized condensate to be fed back to steam generator 23.

A gas mixture from the first compression stage namely from condenser 8 having a pressure of 3.5 . . . 9.0 kPa via outlet 17 is fed to inlet of liquid-gas jet device 9 of the second compression stage. The gas mixture is a mixture of a gas and light hydrocarbon fractions and water vapour not condensed in condenser 8. In liquid-gas jet device 9 the gas mixture is compressed by virtue of energy of the liquid fed therein via inlet 19 using pump 11. In cooling heat exchanger 45 of the second stage of compression of the plant for producing vacuum a heat of the liquid arising both from mechanic energy dissipation in the liquid circulation contour and a condensation of vapours and cooling the gas in liquid-gas jet device 9 is transferred into the environment. This ensures temperature stabilization of the liquid in its circulation contour.

As a result of energy transfer from the liquid to the gas mixture in the course of their mixing a gas-liquid mixture having a pressure greater than a pressure at the inlet of liquid-gas jet device 9 is formed at the outlet of liquid-gas jet device 9. Formed biphasic mixture is supplied to separator 10 preferably at a pressure greater than 0.11 MPa. Both condensation of vapour fractions of the gas mixture that has not got condensed in a flow section of liquid-gas jet device 9 and dissolution of a portion of the gas in the liquid continue in the gas-liquid mixture.

The gas-liquid mixture is separated into a compressed gas and a liquid in separator 10. The compressed gas is supplied to a fueling system of the enterprise via outlet 21, and the liquid is supplied to the inlet of pump 11, thus closing liquid circulation contour. In this contour the liquid flows from pump 11 to liquid-gas jet device 9 and further to separator 10, leaving the latter it returns to the inlet of pump 11. An excess of the liquid formed due to condensed vapours of hydrocarbon fractions and water vapour fed to liquid-gas jet device 9 with the gas mixture, and optionally supplied from an external source of a fresh liquid to the inlet of pump 11 or into separator 10 via pipelines 52 is evacuated from separator 10 via pipeline 53.

As a fresh liquid it is preferred to use a hydrocarbon-containing liquid close in physical/chemical properties to the condensate of hydrocarbon fractions fed to liquid-gas jet device 9 with the gas mixture e.g. diesel fraction. In this case water vapour condensate is separated in separator 10 and evacuated from separator 10 together with the excess of the liquid via pipeline 53 or a separate pipeline 54. It is possible to use water as a fresh liquid. In this case a condensate of hydrocarbon fractions is separated in separator 10 and evacuated from separator 10 together with the excess of the liquid (as a mixture with water) via pipeline 53 or a separate pipeline 54.

A portion of water vapour from steam generator 23 can be fed to gas-gas ejector 7, and the other portion of the vapour can be fed to pipeline 3 for supplying steam to vacuum column 1 and/or to pipeline 2 for supplying oilstock.

Additional gas-gas ejector 38 connected at low-pressure gas inlet 39 to pipeline 6 for discharging vapour-gas medium from the vacuum column can be installed at pipeline 3 for supplying steam from steam generator 23 to vacuum column 1. In this case steam fed to ejector 38 as a high-pressure gas will pump out a portion of vapour-gas medium containing water vapour from pipeline 6 and feed it back to vacuum column 1. This will allow both an amount of steam supplied from steam generator 23 to vacuum column 1 and vapour-gas flow fed to inlet 13 of gas-gas-ejector 7 to be reduced.

By means of the claimed method and a plant for accomplishing thereof actual problems of oil processing are solved namely:
- an ecologically pure technology for producing vacuum in a vacuum oilstock distillation column is provided;
- vacuum depth is increased whereas energy to be consumed for producing thereof is reduced;
- a consumption of steam supplied to the vacuum producing plant from an external source is excluded.

Proposed method and plant as subject matters of invention could be used for producing vacuum a vacuum distillation column for distilling another raw material that differs from the oilstock e.g. in petrochemical or chemical industry.

Figure 1:
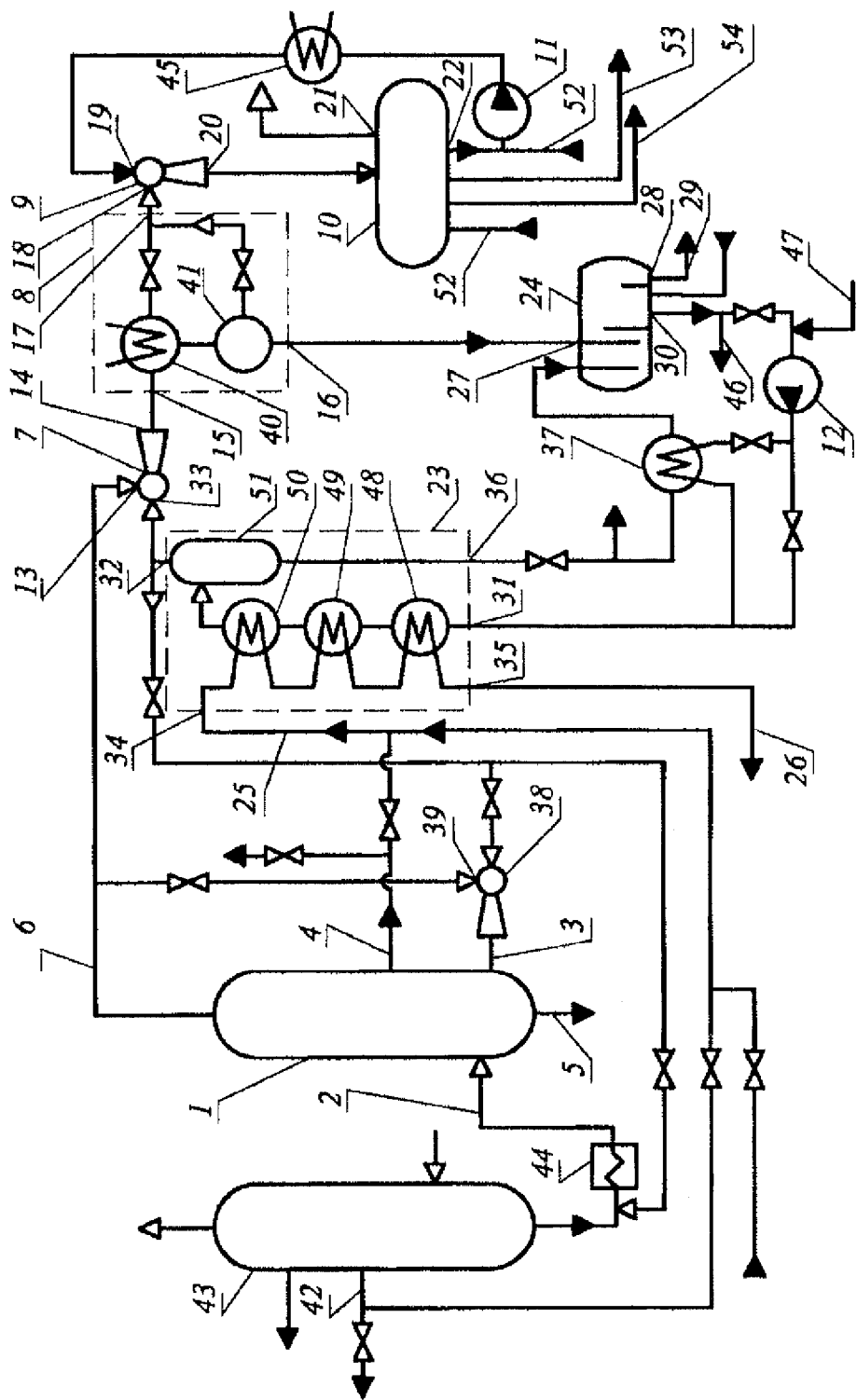
FIG. 1 represents a scheme of a plant for producing vacuum oilstock distillation column.

The invention claimed is:

1. A method for producing vacuum in a vacuum oilstock distillation column, said method comprising:
    pumping out a vapour-gas medium from the vacuum oilstock distillation column using a gas-gas ejector fed with a high-pressure gas to form at an outlet of the gas-gas ejector a vapour-gas mixture having a pressure greater than a pressure of the vapour-gas medium at an inlet thereof,
    supplying the vapour-gas mixture to a condenser followed by cooling thereof and forming a gas mixture and a vapour phase condensate,
    supplying the gas mixture and pumping a liquid to a liquid-gas jet device with a pump,
    mixing the gas mixture and the liquid in the liquid-gas jet device to form a gas-liquid mixture at an outlet thereof,
    supplying the gas-liquid mixture from the liquid-gas jet device to a separator to separate the mixture into a compressed gas and a liquid,
    discharging the compressed gas and supplying the liquid to the inlet of the pump,
    wherein the vapour phase condensate formed in the condenser is supplied to an additional separator wherein the vapour phase condensate is separated into a water-containing condensate and a hydrocarbon-containing condensate, the hydrocarbon-containing condensate is evacuated from the additional separator, and the water-containing condensate is pumped using an additional pump to a steam generator, wherein heat of a hot distillate evacuated from the vacuum oilstock distillation column or from a petroleum distillation column is supplied to the water-containing condensate to produce steam, and the steam produced in the steam generator is fed to the gas-gas ejector as the high-pressure gas.

2. The method according to claim 1, wherein steam having a pressure in a range of 0.2-0.6 MPa is produced in the steam generator.

3. The method according to claim 1, wherein a portion of the water-containing condensate that is not evaporated in the steam generator is supplied to the additional separator.

4. The method according to claim 3, wherein the portion of the water-containing condensate that is not evaporated in the steam generator is cooled in a heat exchanger prior to supply thereof to the additional separator.

5. The method according to claim 1, wherein the steam from the steam generator is additionally supplied to the vacuum oilstock distillation column and/or to oilstock prior to fed thereof to the vacuum column.

6. The method according to claim 1 or 5, wherein the steam from the steam generator is additionally heated in a furnace using heat of hot gases prior to supply thereof to the gas-gas ejector and/or the vacuum oilstock distillation column.

7. The method according to claim 5, wherein the steam from the steam generator is fed to the vacuum oilstock distillation column via an additional gas-gas ejector, wherein the gas-gas ejector additionally evacuates vapour-gas medium from the vacuum oilstock distillation column.

8. A plant for producing vacuum in a vacuum oilstock distillation column, comprising:
    a pipeline for evacuating a vapour-gas medium from the vacuum oilstock distillation column,
    a gas-gas ejector, connected at a low-pressure inlet thereof to the pipeline for evacuating the vapour-gas medium from the vacuum oilstock distillation column, and connected at a vapour-gas mixture outlet thereof to an inlet of a condenser,
    the condenser having a condensate outlet and a gas mixture outlet connected to a liquid-gas jet device via a gas inlet,
    the liquid-gas jet device connected to an outlet of a pump via a liquid inlet and to a separator via a gas-liquid mixture outlet,
    the separator, having a compressed gas outlet and a liquid outlet connected to an inlet of the pump,
    wherein the plant is provided with:
        a pipeline for supplying petroleum or oilstock distillate,
        a pipeline for evacuating petroleum or oilstock distillate from the plant, and
        an additional separator connected at its inlet to a condensate outlet of the condenser and having:
            a hydrocarbon-containing condensate outlet connected to a pipeline for evacuation of a hydrocarbon-containing condensate from the plant, and
            a water-containing condensate outlet connected to an inlet of an additional pump,
        the additional pump having an outlet connected to a water-containing condensate inlet of a steam generator,
        the steam generator having a steam outlet connected to a high-pressure gas inlet of the gas-gas ejector,
        wherein the steam generator at a heating agent inlet thereof is connected to the pipeline for supplying petroleum or oilstock distillate and at a heating agent outlet thereof is connected to the pipeline for evacuating petroleum or oilstock distillate from the plant.

9. The plant according to claim 8, wherein the steam generator has a non-evaporated condensate outlet connected to the additional separator.

10. The plant according to claim 9, wherein the non-evaporated condensate outlet of the steam generator is connected to the additional separator inlet via a heat exchanger.

11. The plant according to claim 8, wherein the steam outlet of the steam generator is additionally connected to the vacuum oilstock distillation column and/or to the pipeline for supplying oilstock to this vacuum column.

12. The plant according to claim 8 or 11, wherein the steam outlet of the steam generator is connected to the high-pressure gas inlet of the gas-gas ejector and/or to the vacuum oilstock distillation column via heat exchange pipes for heating steam in a furnace.

13. The plant according to claim 11, wherein an additional gas-gas ejector connected at a low-pressure gas inlet to the pipeline for evacuating vapour-gas medium from the vacuum column and connected at the steam inlet to the steam outlet of the steam generator is mounted between the steam outlet of the steam generator and the steam inlet of the vacuum oilstock distillation column.

14. The plant according to claim 8, wherein the condenser consists of a vapour condensing device and a phase separator, wherein an inlet of the vapour condensing device is connected to the vapour-gas mixture outlet of the gas-gas ejector, a biphasic mixture outlet of the vapour condensing device is connected to an inlet of the phase separator having a condensate outlet and a gas mixture outlet.

\* \* \* \* \*